United States Patent
Yang

(10) Patent No.: US 6,657,405 B2
(45) Date of Patent: Dec. 2, 2003

(54) AUTOMATICALLY CONTROLLED DC POWER SUPPLY OUTPUT CIRCUIT FOR SHUNTING THE POWER SUPPLY OUTPUT IN RESPONSE TO STORED VOLTAGE OF COUNTER EMF GENERATED BY THE LOAD

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/750,054

(22) Filed: Dec. 29, 2000

(65) Prior Publication Data

US 2002/0085837 A1 Jul. 4, 2002

(51) Int. Cl.[7] .................................................. H02P 5/06
(52) U.S. Cl. ........................ 318/123; 318/440; 323/220; 323/224
(58) Field of Search ................................ 323/220, 231, 323/224; 318/123, 440

(56) References Cited

U.S. PATENT DOCUMENTS

| | | | | |
|---|---|---|---|---|
| 3,641,422 A | * | 2/1972 | Farnsworth et al. | 323/224 |
| 3,691,397 A | * | 9/1972 | Beery | 307/66 |
| 3,914,685 A | * | 10/1975 | Van Gilder | 323/238 |
| 4,042,856 A | * | 8/1977 | Steigerwald | 315/205 |
| 4,220,872 A | * | 9/1980 | Fahey | 307/32 |
| 4,851,756 A | * | 7/1989 | Schaller et al. | 320/126 |
| 4,859,921 A | * | 8/1989 | Archer | 318/599 |
| 5,036,450 A | * | 7/1991 | Kelleher et al. | 323/222 |
| 5,155,289 A | * | 10/1992 | Bowles | 124/3 |
| 5,350,992 A | * | 9/1994 | Colter | 318/807 |
| 5,457,591 A | * | 10/1995 | Mock et al. | 361/18 |
| 6,114,842 A | * | 9/2000 | Simpson et al. | 323/223 |

* cited by examiner

*Primary Examiner*—Rita Leykin
(74) *Attorney, Agent, or Firm*—Bacon & Thomas, PLLC

(57) ABSTRACT

An automatically controlled DC power supply output circuit includes an isolation diode connected in series between the power supply and the load, a terminal voltage detection circuit connected in parallel between the power supply and the load on the load side of the isolation diode, and a shunt resistor connected in parallel between the power supply and load on the power supply side of the isolation diode. A control element such as a switch or variable impedance is connected in series with the shunt resistor to cause the shunt resistor to shunt current from the power supply when the terminal voltage detection circuit detects that the terminal voltage exceeds a predetermined threshold, for example due to stored voltage in case the load is a battery, secondary cell, or capacitor, or due to counter EMF generated by the load in case the load is a DC motor, thereby reducing the power supply output voltage to compensate for the detected increase in terminal voltage.

19 Claims, 2 Drawing Sheets

US 6,657,405 B2

AUTOMATICALLY CONTROLLED DC POWER SUPPLY OUTPUT CIRCUIT FOR SHUNTING THE POWER SUPPLY OUTPUT IN RESPONSE TO STORED VOLTAGE OF COUNTER EMF GENERATED BY THE LOAD

BACKGROUND OF THE INVENTION

1. (a) Field of the Invention

An automatically controlled DC power supply output circuit for shunting the power supply output in response to stored voltage or counter EMF (Electro Motive Force) generated by the load includes an isolation diode connection in series between a D.C. power source and a battery, secondary cell, or capacitor is in which a voltage is stored or a D.C. motor bearing an armature in which counter EMF is generated, and a shunt resistor connected in parallel across the power supply. The shunt resistor is controlled by a load voltage testing circuit in such a manner that when the terminal voltage of the output circuit exceeds a predetermined threshold, excess stored voltage or counter EMF is shunted through the shunt resistor to reduce voltage on the power supply side, and thereby bring about a cut in the voltage differential with respect to the loading terminal, so that the power delivered to the load is reduced in the long run.

2. (b) Description of the Prior Art

The conventional output circuit includes an automatic control mode which, during supply of power to a secondary cell, capacitor, voltage-storing super capacitance, or armature counter EMF sustained D.C. motor, controls the loading voltage or current by means of a master controller connected in series with the load. Such a conventional design, due to circuitry complication, incurs elevated costs.

SUMMARY OF THE INVENTION

The essence of the invention lies in the serial incorporation of an isolation diode between the D.C. power supply and a battery that is charged with a stored voltage, or a load that generates counter EMF, such that once the terminal voltage of the power supply output circuit exceeds a predetermined threshold, a resistor connected in parallel across the power supply is made conductive by the load voltage testing circuit, so that voltage on the power supply side is reduced, bringing about a cut in the voltage differential with respect to the loading terminal, so that power that is being delivered to the load is reduced in the long run.

DETAILED DESCRIPTION OF THE PREFERRED EMBODIMENTS

Figure 1:
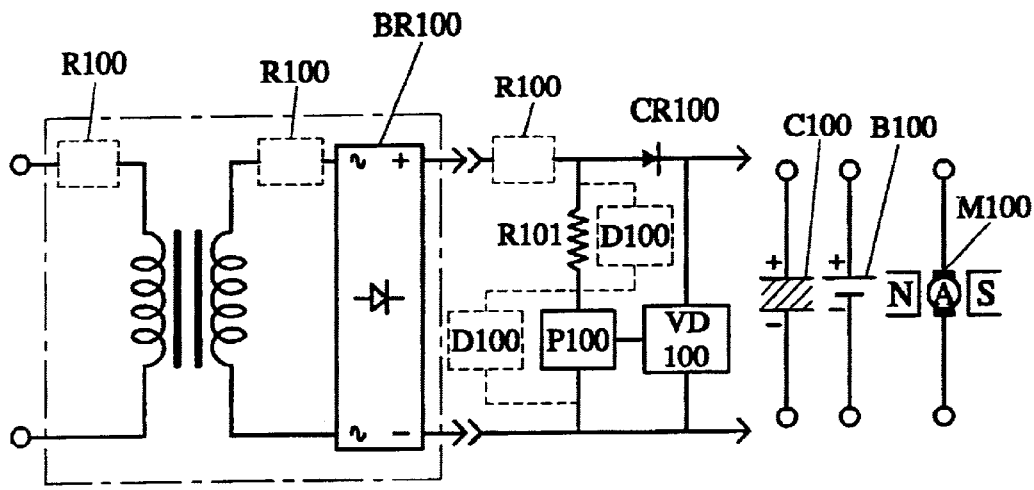
FIG. 1 is a block diagram of the circuitry according to the invention.

FIG. 1 is a block diagram of the circuitry according to the invention, which includes a D.C. power supply arranged to output a direct current upon rectification of a line voltage through full-wave rectifier BR100 or through a half-wave rectifier (not shown). An optional resistor R100 in the form of a regular positive temperature coefficient (PTC) resistor or negative temperature coefficient (NTC) resistor, may be connected in series with the output of the power supply. A shunt resistor R101 including a regular PTC resistor or NTC resistor may be connected in series with a power control P100. Power control 100 may include a mechanical switch, solid state switching element, or solid state linear element. Shunt resistor R101 and power control P100 are together connected in parallel across the output of the power supply, optionally via a series connected D.C. resistor R100, and are also connected in series with the load via an isolation diode CR100 that is in turn series-connected between the output of the power supply and the output to the load.

The invention further includes a load voltage testing circuit VD100 composed of a mechanical switch or solid state switching element, connected in parallel across both ends of the load to drive the power control element P100 so that it functions as a switch, or to reduce the impedance of the power control element P100 in a gradual, linear manner. Once the voltage on the load terminal rises beyond a predetermined threshold, the shunt resistor R101 starts to shunt current from the power supply, which in turn serves to narrow the voltage differential between the output of the power supply and the load terminal, so that power going to the load is reduced accordingly. Depending on the construction of testing circuit VD100, power control element P100 may be in the form of a mechanical relay, thyristor, IGBT, MOSFET, or a common linear transistor.

An output status display D100 in the form of an electric-power-to-acoustic power converter or an electric-power-to-optic-power converter and which may either be electro-mechanical or solid state, is optionally connected in parallel across both ends of the shunt resistor. A change in terminal voltage serves to drive the output status display D100 into a corresponding acoustic or optic shunt status display. Alternatively, the display D100 may be connected in parallel across both ends of the power control element P100 that controls the shunt resistor, in which case voltage fluctuations across the power control element P100 serve to drive the output status display D100 into a corresponding acoustic or optic shunt status display.

The load may be a secondary battery B100, a capacitor or super-capacitance capacitor C100 capable of storing voltage, or a D.C. motor M100 that generates armature counter EMF.

By means of the aforementioned load voltage testing circuit VD100, which controls the power control element P100, once voltage on the load side rises to a level sufficient to subject the power control element P100 to shunt control, the shunt resistor R101 will carry shunt current, so that any voltage differential between the power supply side and the load side is reduced in the long run.

Figure 2:
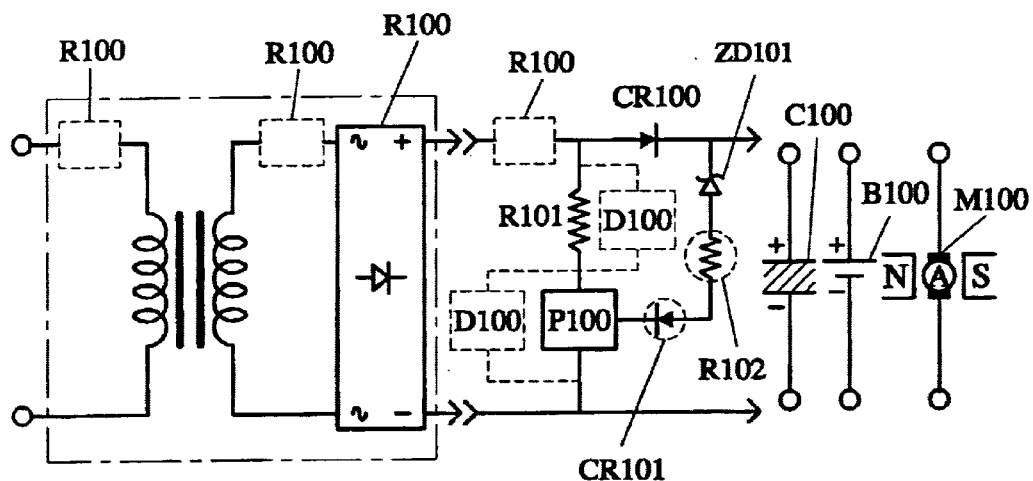
FIG. 2 is an illustration of the voltage testing circuit according to the invention.
Figure 3:
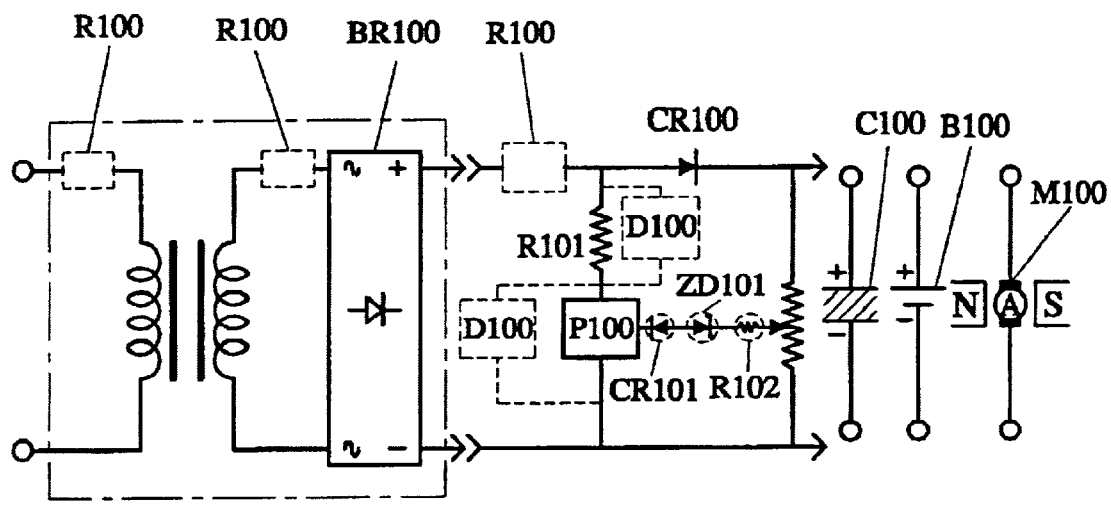
FIG. 3 is another illustration of the voltage testing circuit according to the invention.

FIG. 2, shows a preferred embodiment of the voltage testing circuit according to the invention, including:

(1) One or more zener diodes ZD101; or alternatively;

(2) A forward bias voltage (VF) circuit made up of one or more diodes CR101; or (3) A series combination of a zener diode and a diode; and (4) A series-connected current-limiting resistor R102 in addition to what is defined under (1), (2) or (3);

In addition, as shown in FIG. 3, a variable resistor VR 100 may be connected in parallel across the load. This is in addition to the circuit elements defined in (1) through (4), which are connected to the variable potential terminal that forms part of the variable resistor.

Where and as dictated by specific applications, the aforementioned voltage testing circuit maybe employed to drive power control elements directly or in a roundabout way by the intervention of a photo coupler, etc.

Also, where the D.C. power supply in the circuit is obtained through a transformer, followed by rectification of the transformer output, the aforementioned resistor R100 may be incorporated serially as required on the primary input side or secondary input side of the transformer, or alternatively the voltage may be downgraded by transformer impedance or by electromagnetic leakage, in which case the resistor R100 may be omitted altogether.

In summation, the invention provides an automatically controlled output circuit that shunts the power supply output in response to stored voltage or counter electro motive force generated by the load by means of concise and simply structured circuitry.

What is claimed is:

1. An automatically controlled DC power supply output circuit, comprising:
   - an isolation diode connected in series between the DC power supply and the load;
   - on a load side of the isolation diode, a terminal voltage detection circuit connected in parallel across the load;
   - on a power supply side of the isolation diode, a shunt resistor connected in parallel across the power supply;
   - a current-limiting impedance connected in series between the power supply and the shunt resistor; and
   - power control means for causing said shunt resistor to shunt current from the power supply in response to detection by the terminal voltage detection circuit that a terminal voltage has exceeded a predetermined threshold.

2. An automatically controlled DC power supply output circuit as claimed in claim 1, wherein said power control means is a switch connected in series with said shunt resistor and arranged to close in response to said detection that the terminal voltage has exceeded the predetermined threshold.

3. An automatically controlled DC power supply output circuit as claimed in claim 2, wherein said switch is a mechanical switch.

4. An automatically controlled DC power supply output circuit as claimed in claim 2, wherein said switch is a solid state switch.

5. An automatically controlled DC power supply output circuit as claimed in claim 1, wherein said power control means is a variable impedance connected in series with said shunt resistor and arranged such a resistance of said variable impedance is reduced in response to said detection that the terminal voltage has exceeded the predetermined threshold.

6. An automatically controlled DC power supply output circuit as claimed in claim 1, wherein said variable impedance is a solid state linear element.

7. An automatically controlled DC power supply output circuit as claimed in claim 1, wherein said terminal voltage detection circuit is a variable resistor connected in parallel across the load and including a variable potential terminal connected to said control element.

8. An automatically controlled DC power supply output circuit as claimed in claim 1, wherein said current-limiting impedance is a resistor connected in series between said power supply and said isolation diode.

9. An automatically controlled DC power supply output circuit as claimed in claim 8, wherein said resistor connected in series between the power supply and the isolation diode is a positive temperature coefficient resistor.

10. An automatically controlled DC power supply output circuit as claimed in claim 8, wherein said resistor connected in series between the power supply and the isolation diode is a negative temperature coefficient resistor.

11. An automatically controlled DC power supply output circuit as claimed in claim 1, wherein said DC power supply includes a full-wave bridge rectifier.

12. An automatically controlled DC power supply output circuit as claimed in claim 1, wherein said DC power supply includes a transformer.

13. An automatically controlled DC power supply output circuit as claimed in claim 12, and further comprising a resistor connected in series with either a primary or secondary winding of said transformer.

14. An automatically controlled DC power supply output circuit as claimed in claim 1, wherein said power control means is selected from the group consisting of a mechanical relay, a thyrister, an IGBT, a MOSFET, and a linear transistor.

15. An automatically controlled DC power supply output circuit as claimed in claim 1, further comprising an output status display means connected in parallel across the load for indicating changes in terminal voltage and operation of the shunt circuit.

16. An automatically controlled DC power supply output circuit as claimed in claim 1, wherein the load is a battery.

17. An automatically controlled DC power supply output circuit as claimed in claim 1, wherein the load is a secondary cell.

18. An automatically controlled DC power supply output circuit as claimed in claim 1, wherein the load is a capacitor.

19. An automatically controlled DC power supply output circuit as claimed in claim 1, wherein the load is a DC motor having an armature in which counter EMF is generated.

* * * * *